(12) United States Patent
Cooper

(10) Patent No.: US 9,908,593 B2
(45) Date of Patent: Mar. 6, 2018

(54) RAINWATER HARVESTING SYSTEM

(71) Applicant: X Development LLC, Mountain View, CA (US)

(72) Inventor: Kathleen Cooper, Palo Alto, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 15/258,747

(22) Filed: Sep. 7, 2016

(65) Prior Publication Data

US 2017/0057602 A1 Mar. 2, 2017

Related U.S. Application Data

(63) Continuation of application No. 14/254,448, filed on Apr. 16, 2014, now Pat. No. 9,469,383.

(51) Int. Cl.
| | |
|---|---|
| *B63B 25/08* | (2006.01) |
| *B63B 35/00* | (2006.01) |
| *B63B 1/04* | (2006.01) |
| *B63B 11/00* | (2006.01) |
| *B63B 25/10* | (2006.01) |
| *B63J 3/00* | (2006.01) |

(52) U.S. Cl.
CPC .............. *B63B 35/00* (2013.01); *B63B 1/047* (2013.01); *B63B 11/00* (2013.01); *B63B 25/10* (2013.01); *B63B 2035/007* (2013.01); *B63B 2209/18* (2013.01); *B63B 2213/02* (2013.01); *B63J 2003/003* (2013.01); *Y02E 10/727* (2013.01)

(58) Field of Classification Search
CPC ......... B63B 35/00; B63B 22/24; B63B 25/08; B63B 25/10; B65D 88/78; E03B 3/02
See application file for complete search history.

(56) References Cited

U.S. PATENT DOCUMENTS

| | | | |
|---|---|---|---|
| 3,230,967 A | 1/1966 | Castro | |
| 3,730,120 A | 5/1973 | Dobell | |
| 7,320,289 B1 * | 1/2008 | Clarke | B63B 35/665 114/256 |
| 8,028,660 B2 | 10/2011 | Troy | |
| 9,469,383 B1 | 10/2016 | Cooper et al. | |
| 2012/0006277 A1 | 1/2012 | Troy et al. | |
| 2012/0192779 A1 * | 8/2012 | Teppig, Jr. | B60F 3/0015 114/256 |

(Continued)

FOREIGN PATENT DOCUMENTS

| | | |
|---|---|---|
| GB | 2493699 A | 2/2013 |
| WO | 2002040125 A2 | 5/2002 |
| WO | WO 2005/117573 | 12/2005 |

(Continued)

*Primary Examiner* — Stephen P Avila
(74) *Attorney, Agent, or Firm* — Fish & Richardson P.C.

(57) ABSTRACT

A system for collection of rainwater in the open ocean may include: (a) one or more ocean-going vessels, wherein each ocean-going vessel is configured for collection and storage of rainwater, wherein each ocean-going vessel is configured to drift with surface ocean currents in order to navigate to one or more delivery locations, wherein each delivery location is on or near to a land mass; and (b) one or more delivery stations located at the one or more delivery locations, wherein each delivery station is configured to receive stored rainwater from one or more of the ocean-going vessels.

18 Claims, 7 Drawing Sheets

(56) References Cited

U.S. PATENT DOCUMENTS

2014/0129031 A1    5/2014  Carter et al.
2014/0319076 A1*  10/2014  Galushko ............... B63G 8/001
                                                              210/747.6

FOREIGN PATENT DOCUMENTS

WO         2007042860 A1    4/2007
WO   WO 2007/042861      4/2007

* cited by examiner

RAINWATER HARVESTING SYSTEM

CROSS-REFERENCE TO RELATED APPLICATIONS

The present application is a continuation of co-owned U.S. patent application Ser. No. 14/254,448 filed Apr. 16, 2014, which is incorporated by reference herein in its entirety and for all purposes.

BACKGROUND

As the population of the world increases, sources of fresh water are becoming increasingly important. Rainwater is an inexpensive source of freshwater. However, collection of rainwater has typically been limited to land. Since a significant amount of rain falls over the world's oceans, it would be desirable to have a system for collecting rainwater in the open ocean.

SUMMARY

Example embodiments may take the form of or relate to autonomous, ocean-going, "rain-catcher" vessels. Herein, such a rain-catcher vessel may also be referred to as a "raft." Such rafts may take advantage of surface ocean currents to travel throughout a large area of the ocean, using little to no power for purposes of propulsion. A fleet of such rafts could provide a low-energy, inexpensive, system for collecting and bringing fresh water to coastal cities and islands.

In one aspect, an example system includes: (a) one or more ocean-going vessels, wherein each ocean-going vessel comprises a water storage chamber and is configured for collection and storage of rainwater in the water storage chamber, wherein each ocean-going vessel is configured to drift with surface ocean currents in order to navigate to one or more delivery locations, and wherein each delivery location is on or near to a land mass; and (b) one or more delivery stations located at the one or more delivery locations, wherein each delivery station is configured to receive stored rainwater from one or more of the ocean-going vessels.

In another aspect, an example ocean-going vessel includes: (a) a water storage chamber for storage of rainwater; (b) at least one inflatable side feature, wherein an interior surface of the at least one inflatable side feature defines, at least in part, the water storage chamber of the at least one ocean-going vessel; and (c) one or more openings to the water storage chamber that are configured to allow rainwater into the water storage chamber, wherein the ocean-going vessel is configured to drift with surface ocean currents in order to navigate to one or more delivery locations that are located on or near to one or more land masses.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
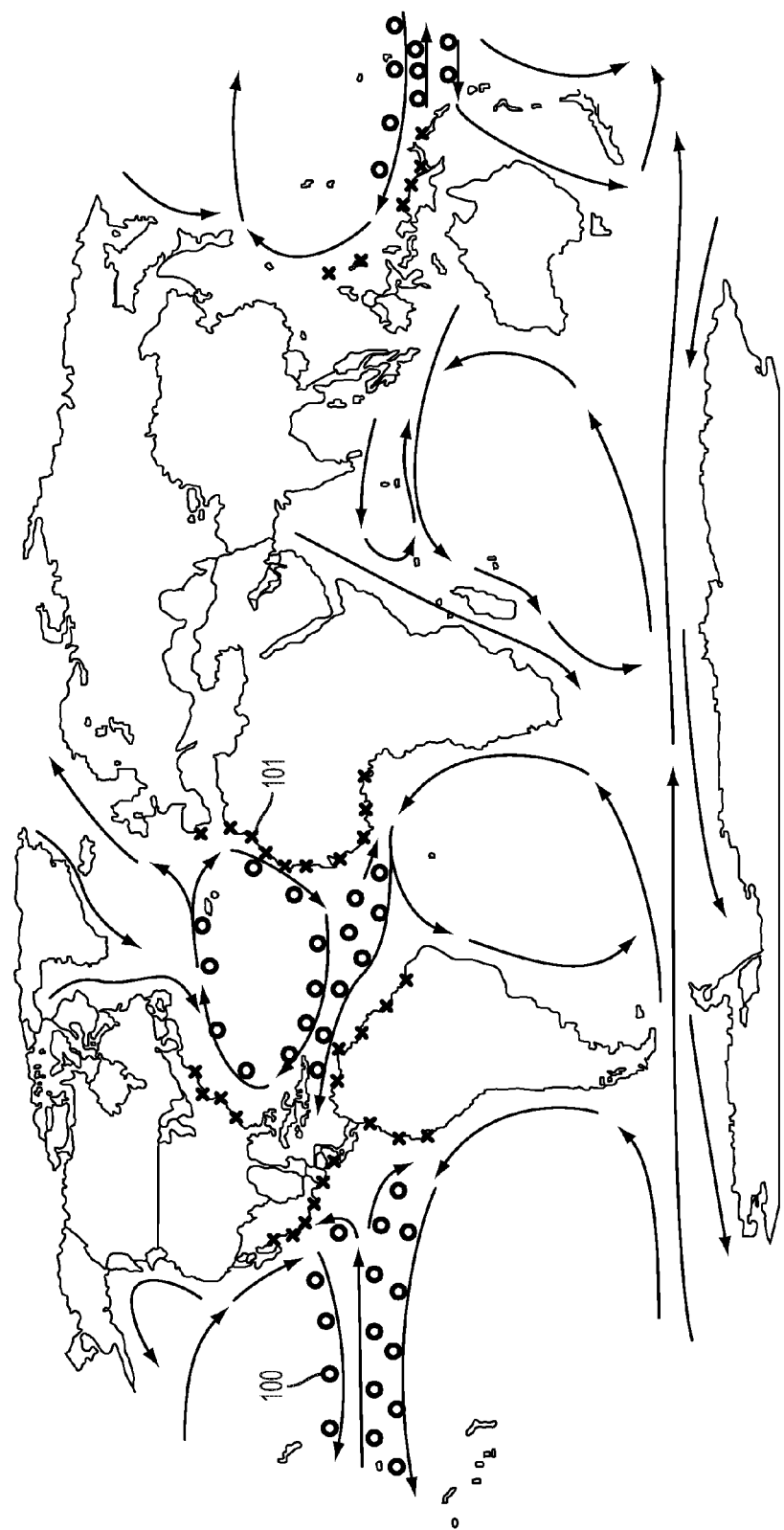
FIG. 1A is a simplified illustration showing ocean currents around the world and a fleet of rafts, according to an example embodiment.

The following detailed description describes various features and functions of the disclosure with reference to the accompanying Figures. In the Figures, similar symbols typically identify similar components, unless context dictates otherwise. The illustrative systems described herein are not meant to be limiting. It will be readily understood that certain aspects of the disclosure can be arranged and combined in a wide variety of different configurations, all of which are contemplated herein.

I. Overview

In an example embodiment, a fleet of ocean-going "rain-catcher" vessels (i.e., rafts) may include many rafts that are distributed throughout the world's oceans. The rafts may be configured to move on surface ocean currents, such that the fleet can provide a steady supply of fresh water to delivery stations at different locations throughout the world.

For instance, in an example embodiment, rafts may ride the gyres that are formed by surface ocean currents in order to deliver water to a number of coastal delivery stations. More specifically, surface ocean currents (e.g., in the upper 400 meters of the ocean) form a number of rotating currents referred to as "gyres," with clockwise gyres in the northern hemisphere, and counter-clockwise gyres in the southern hemisphere. Each gyre typically includes an east-to-west transverse current, a western boundary current, a west-to-east transvers current, and an eastern boundary current. For example, the North Atlantic Gyre is formed by the N. Equatorial Current (an east-to-west transverse current), the Gulf Stream (a western boundary current), the N. Atlantic Current (a west-to-east transverse current), and the Canary Current (an eastern boundary current).

It should be understood that an ocean-going vessel or raft is not limited to use in the ocean. References to an ocean-going vessel or raft should be understood to include any type of vehicle or vessel that is positively buoyant in a body of water, such as an ocean, a sea, a lake (which could be naturally-occurring, or conceivably even man-made), or a river.

II. Illustrative Fleets for Open-Ocean Rain Collection and Distribution

An example system may include a fleet with many rafts, which can be distributed throughout the world's oceans. The rafts may be configured to move on surface ocean currents, such that the fleet can provide a steady supply of fresh water to delivery stations at different locations throughout the world.

More generally, an example system may include one or more ocean-going vessels (e.g., a fleet of rafts) that are each configured for collection and storage of rainwater, and one or more delivery stations that are each configured to receive stored rainwater from one or more of the ocean-going vessels. The delivery stations may be located on or near to a land mass, and thus may be referred to as "on-shore" or "near-shore" delivery stations. In accordance with an example embodiment, the ocean-going vessels (e.g., rafts) may drift with surface ocean currents in order to navigate to one or more delivery locations, such that rainwater collected in the open ocean can be utilized on land.

In an example embodiment, rafts may drift with gyres formed by surface ocean currents in order to deliver water to a number of coastal delivery stations. More specifically, surface ocean currents (e.g., in the upper 400 meters of the ocean) form a number of rotating currents referred to as "gyres," with clockwise gyres in the northern hemisphere, and counter-clockwise gyres in the southern hemisphere. Each gyre typically includes an east-to-west transverse current, a western boundary current, a west-to-east transvers current, and an eastern boundary current. For example, the North Atlantic Gyre is formed by the N. Equatorial Current (an east-to-west transverse current), the Gulf Stream (a western boundary current), the N. Atlantic Current (a west-to-east transverse current), and the Canary Current (an eastern boundary current).

FIG. 1A shows ocean currents around the world and a fleet of rafts. In FIG. 1A, the rafts are represented by circles, and delivery stations are each represented by an "x". At least some of the rafts in the fleet may be operable to circulate on the North Atlantic Gyre, which is formed by the North Equatorial Current, the Gulf Stream, the North Atlantic Current, and the Canary Current. The rafts that ride the North Atlantic Gyre can collect and deliver rainwater to delivery stations in the Caribbean and/or along the east coast of the U.S., and/or to delivery stations along the coast of Portugal and/or along the northwest coast of Africa.

More generally, a raft may collect rain water as it crosses the ocean on a transverse current, and transfer the collected rain water to one or more on-shore or near shore delivery stations at the end of the transverse current or at a coastal location adjacent to a boundary current.

As an example, when utilizing the North Atlantic Gyre, a raft may collect rainwater as it floats across the Atlantic Ocean on the N. Equatorial Current. The raft may then steer to one or more delivery locations accessible at the west end of the N. Equatorial Current and/or accessible via the Gulf Stream (e.g., in the Caribbean and/or along the east coast of the U.S.), where the collected water can be transferred from the raft to land. The raft may then at least partially refill its water storage compartment by collecting rain as it floats along the Gulf Stream and/or as it floats along the N. Atlantic current. (Note that the timing with which a raft collects rainwater may be dynamic; i.e., the raft may collect rainwater whenever its water storage is less than full.) After traversing the Atlantic Ocean on the N. Atlantic current, the raft may deliver water to one or more delivery locations accessible via the east end of the N. Equatorial Current and/or accessible via the Canary current (e.g., delivery locations along the coast of Portugal and/or along the northwest coast of Africa).

In a further aspect, rafts may additionally or alternatively utilize Equatorial counter currents to increase the amount of rain that can be collected and delivered to land in a given period time. More specifically, the amount of annual rainfall near the equator is generally much greater than at more northern and southern locations in the ocean. As such, one or more rafts in a fleet may be travel back-and-forth across the ocean by alternatingly riding an equatorial current and an equatorial counter current.

As a specific example, a raft may collect rainwater as it floats across the Atlantic Ocean on the N. Equatorial Current (e.g., from the west coast of Africa towards the Caribbean. The raft may then steer to one or more delivery locations accessible at the west end of the N. Equatorial Current (possibly utilizing some type of powered propulsion system, if winds and/or currents are not conducive to such movement). After transferring water from its storage to the delivery station, the raft may steer to the Equatorial Counter Current that is south of the N. Equatorial Current. The raft may then refill its water storage compartment by collecting rain as it floats along the Equatorial Counter Current back towards the west coast of Africa, where water may again be transferred from the raft.

In a further aspect, some water-collection systems may further include mid-ocean docking stations, which may also be referred to herein as open-ocean docking stations. Such mid-ocean docking stations may be located in various locations in the paths of surface ocean currents. Located as such, a mid-ocean docking station may provide an open-ocean "rest stop" for rafts that are traveling between land masses on a surface ocean current.

A mid-ocean docking station may include structural and/or mechanical features that allow a raft to dock at the mid-ocean docking station. While a raft is docked, the mid-ocean docking station may provide various services, such as: (a) re-charging an electrical power system on the raft, (b) re-fueling, (c) performing various types of maintenance procedures on the raft, and/or (d) running diagnostic tests on the raft, among other possibilities.

In addition, a mid-ocean docking station may be configured to transfer water from the raft's water storage to water storage in the mid-ocean docking station. To do so, a mid-ocean docking station may be configured in a similar manner as a near-shore or on-shore delivery station. Thus, if a raft's water storage is full or nearly full when it reaches a mid-ocean docking station, the raft may transfer water to the mid-ocean docking station so that the raft can continue collecting rainwater as it moves along the surface ocean current.

Further, water that transferred to a mid-ocean docking station, may be transferred from the mid-ocean docking station to land in various ways. For example, water may be transferred from the mid-ocean docking station to land by specialized water-transfer vessels, by other rafts (e.g., those that have empty water storage or lower levels of collected rainwater, and/or by a pipeline. Other configurations and processes for water transfer from a mid-ocean docking station to land are also possible.

III. Control Systems for Rain-Collection Rafts

Control and coordination of the rafts in a fleet may be provided in various ways. In some embodiments, a central control system may be configured to make fleet-planning decisions for the ocean-going vessels (e.g., rafts) in a fleet. The central control system could be implemented as a land-based system, or could be implemented on an ocean-going vessel (e.g., one of the rafts in the fleet or a specialized ocean-going control vessel).

In some embodiments, the central control system may be configured to communicate with rafts via satellite-based systems. Additionally or alternatively, the central control system could communicate with rafts via a balloon network (e.g., a network of high-altitude balloons). A central control system could also use other types of communication networks and/or communication protocols to communicate with rafts, in addition or in the alternative to those described herein.

In some embodiments, control of a fleet may be distributed amongst a number of regional control systems, which are configured to collectively make fleet-planning decisions for the rafts in the fleet. The regional control systems could be implemented at locations on land (e.g., at various coastal locations), or on a number of fixed floating platforms fixed and/or moveable ocean-going vessels (e.g., one or more of the rafts or one or more specialized ocean-going control vessel). In some embodiments, the regional control systems may include a combination of land-based control systems, and fixed floating platforms fixed and/or moveable ocean-going vessels. In other embodiments, each raft may include its own control system, which functions to control steering and/or other functions for the raft.

In any control configuration, control decisions for a raft may be based upon various factors. For example, fleet-planning decisions may be based upon: (a) demand for water at various delivery locations (and/or in areas that are supplied by various delivery stations), (b) weather data such as precipitation forecasts, wind forecasts, etc., (c) path or location prioritization factors (e.g., remaining near equator to increase rain-collection capabilities), (d) ocean-current data (e.g., predicted speeds and directions or ocean currents), and/or (e) water collection levels in various rafts (e.g., so that rafts that are full are almost full can be moved towards delivery locations sooner than rafts that have collected less rainwater), among other possibilities.

In a further aspect, rafts may include sensors to record data related to ocean currents, such as direction of water movement, speed of water movement (possibly at various depths), water temperature, surface temperature, and/or wind speed at or near water level, among other possibilities. Therefore, data provided by a fleet of rafts may improve the information that is available about ocean currents, and possibly even provided improved real-time ocean-current data.

Further, ocean-current data generated by the rafts may be used to improve the ability to predict the movement (e.g., speed and direction) of ocean currents at various locations, which may in turn allow a control system to make better fleet-planning decisions for a fleet of rafts. For example, improved predictive capabilities may help a control system determine when it is appropriate for certain rafts to move between different surface ocean currents. Further, improved predictive capabilities may help a control system to make fleet-planning decisions that increase the usage of ocean currents to move particular rafts (e.g., by planning routes that reduce the usage of a certain rafts' propulsion systems and/or the need for other boats to manually move rafts).

IV. Illustrative Rafts

In an example embodiment, each raft in the fleet may be equipped with: (a) GPS and/or other location-determination systems (and possibly with motion sensors as well), and (b) a rudder system and/or other types of systems that allow for steering. Thus, while a raft may primarily rely on ocean currents to carry it to and from delivery stations, GPS and/or other location-determination systems, motion sensors, and/or position sensors may be used to detect a raft's location and/or trajectory, and to steer the raft when appropriate. Such motion and/or position sensors may include one or more accelerometers, one or more gyroscopes, and/or one or more magnetometers, among other possibilities.

Further, each raft may include a water-level sensor in its water storage compartment. The water-level sensor may indicate when at least a threshold amount of water has been collected, and/or may indicate the total amount of water that is stored in the raft's water storage. Accordingly, a raft may collect rainwater in the open ocean until it detects that its water storage is full, and then deliver the water to land via a delivery station. Additionally or alternatively, a raft may use a water-level sensor in an effort to time its movement such that the raft reaches a delivery station at a time when its water storage is expected to be full or expected to be at some desired level.

Figure 1B:
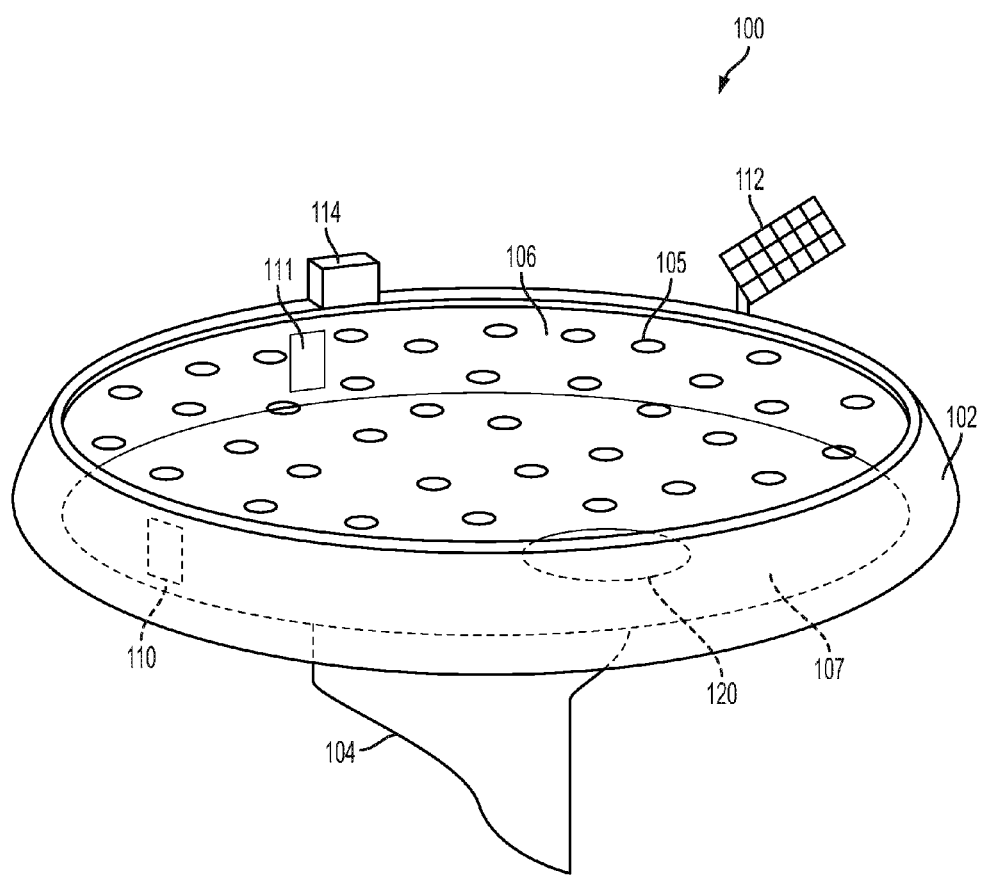
FIG. 1B is an illustration of a raft, according to an example embodiment.

FIG. 1B is an illustration of a raft 100, according to an example embodiment. In the illustrated example, raft 100 includes an inflatable side feature 102. The inflatable side feature 102 may take the form of an inflatable tube have a circular or ellipsoidal shape. The inflatable side feature 102 surrounds the floor 107 of the raft 100. As such, rainwater may be collected and stored in the volume formed by the inflatable side feature 102 and the floor 107 (herein, this volume may also be referred to as the raft's "water storage" or "water storage chamber"). Note that the floor may be made of a flexible material, such that the floor expands as the raft 100 is filled with rainwater.

Further, in the illustrated example, the opening surrounded by the inflatable side feature 102 is substantially covered by a top cover 106. The top cover 106 has perforations 105 and may be formed from a somewhat flexible material, such that rainwater can flow through the perforations 105 into the raft's water storage chamber. The top cover 106 may also help to prevent rainwater that has already been collected from splashing out of the raft's water storage chamber. Further, in some embodiments, top cover 106 may be formed from a clear material (e.g., a clear plastic material), which allows ultraviolet (UV) rays to pass through. Exposing the rainwater in the raft's water storage chamber to UV light may help to prevent bacteria growth, among other possible benefits.

In a further aspect, raft 100 includes a housing 114 for control and communication systems. The housing 114 may include electrical components and systems, such as GPS receiver and/or other types of location-determination systems. The housing 114 may also include a wireless communication system and a control system for the raft. A wireless communication system may allow the raft to send data to, and to receive data (e.g., operational instructions, navigation instructions, weather data, etc.) from remote entities, such as other rafts, other types of ocean-going vessels, satellites, balloons, and/or other types of aerial vehicles, among other possibilities.

A raft 100 may include various sensors. For example, raft 100 includes a water-level sensor 110, which is configured to indicate the level and/or amount of water in the water storage chamber of raft 100. Further, raft 100 includes a salinity sensor 111 that is positioned in the water storage and is configured to indicate the salinity of the water that is stored in the water storage chamber. If the salinity is above the level that is typical of rainwater, this may be an indication that there is a leak in the water storage chamber, that seawater has splashed into the water storage chamber, or that seawater has otherwise contaminated the water that is stored in the water storage chamber.

In a further aspect, a control system 114 may be configured to detect when the salinity level is too high (e.g., above a predetermined threshold salinity level) and send an alert message. Additionally or alternatively, if the salinity of the water in the water storage chamber is above a threshold level, control system 114 may be configured to open the drain feature 120 to drain water some or all of the water from the water storage chamber, such that the water storage chamber can be refilled with rainwater that has not been mixed with seawater.

For example, a raft 100 may be configured to communicate with other rafts and/or with a central or regional fleet-control system (either directly or via a network connection such as a satellite or balloon-network connection location data). Data that is sent to other rafts and/or to a fleet-control system may include location data, route-planning data, water-level data, raft-status data, and/or other sensor data collected by sensors on the raft, among other possibilities. A raft 100 may also receive such data from other rafts in the fleet. Additionally or alternatively, a raft 100 may receive communications that include operational instructions, navigation instructions, weather data, etc., from a central or regional fleet-control system.

Further, raft 100 includes a solar power system 112, which may be configured to generate power for use by electrical components of the raft. For example, solar power system 112 may be used to provide power for control and communication systems 114 and/or water-level sensor 110.

Raft 100 also includes a rudder 104, which is operable to steer the raft. Thus, while raft 100 may primarily rely on ocean currents to carry it to and from delivery stations, the rudder may be used where appropriate to steer the raft in a desired direction. In an example embodiment the rudder could take the form of a large fin under the raft, which operate in the manner that a rudder typically does. The rudder could then be controlled to achieve a desired trajectory for the raft. Further, the power to move the rudder and/or hold it in a desired position could be provided by solar panel(s) 112.

In some embodiments, the raft 100 may include a drain feature 120 at or near the bottom of the water storage chamber, which allows for water to be transferred from the raft 100 to a delivery station. For example, drain feature 120 may include a threaded cap that can be unscrewed in order to remove water from the water storage chamber. Other types of drains that can be sealed during water collection and opened in order to transfer water from the raft are also possible. Note that the positioning of the drain feature 120 at or near the bottom of the water storage chamber allows for static water pressure to be used to push the water through the drain feature 120.

Figure 2A:
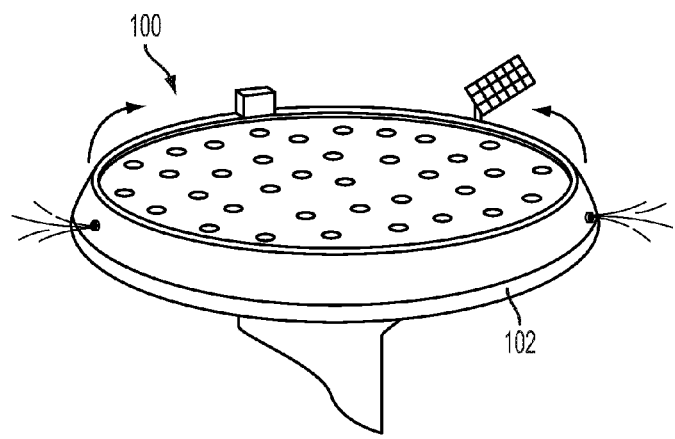
FIGS. 2A to 2C illustrate the operation of a closure mechanism on a raft, according to an example embodiment.
Figure 2B:
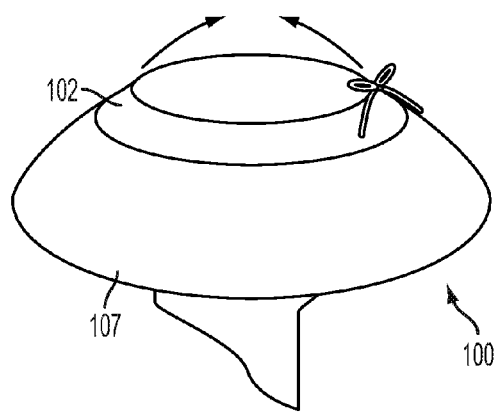
Figure 2C:
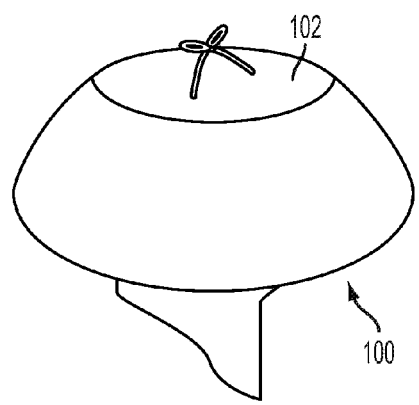

In a further aspect, raft 100 may include a closure mechanism (not shown in FIG. 1B), which allows the water storage chamber to be closed, such that no more rain will be collected. For example, FIGS. 2A to 2C illustrate the operation of such a closure mechanism. In particular, when the water storage chamber of raft 100 is full, or it is otherwise determined that rainwater collection should cease for at least some period of time, the inflatable side feature 102 may be deflated, as shown in FIG. 2A. As the inflatable side feature 102 deflates, a drawstring feature around the top of the inflatable side feature 102 may be pulled tight in order to close the opening. (Note that the top cover 106 may be rolled up or otherwise removed and stored away, before the drawstring feature begins to close the opening at the top of the inflatable side feature 102.)

As the drawstring closes the opening at the top of the inflatable side feature 102, the floor 107 of the raft 100 may be pulled up to form a cup-like shape, as shown in FIG. 2B. Once the drawstring feature is fully closed, the water-storage chamber may be sealed off, as shown in FIG. 2C. The sealed raft, with its cup-like shape, is more compact and thus may be better suited for steering and/or riding ocean currents. Further, sealing the water-storage chamber may help to prevent saltwater splashes from contaminating the rainwater that is stored in the water-storage chamber.

Note that when most or all of the water has been transferred from the raft (e.g., via a drain feature 120), the drawstring may be released and the inflatable side feature(s) 102 can be re-inflated. As such, the raft can return to a configuration such as that shown in FIG. 1B, in which the raft is capable of collecting rain water.

In a further aspect of some embodiments, a raft may be powered, at least in part, by an airborne wind turbine (AWT), which is not shown in FIG. 1B or FIGS. 2A to 2C. In an example embodiment, the raft's AWT includes a tethered aerial vehicle that flies in a circular or ellipsoidal path in order to convert wind energy into electrical energy. The electrical energy is then relayed to a ground station on the raft via the tether. Such an AWT may be less complex to install and use in the open ocean than other types of green power generation systems (e.g., traditional wind turbines). Further, an AWT may have greater power generation capabilities than other systems that can be readily installed on a raft, such as a solar power generation system. In a further aspect, the AWT's aerial vehicle could also serve as a propulsion system for the raft, e.g., by pulling it through the water in a desired direction. Illustrative AWTs are described in greater detail in section VI below.

It should be understood that a raft 100 may include other types of steering and/or propulsion systems. For example, a raft could include trim tabs, a traditional gas engine, an electric engine, and/or one or more sails, among other possibilities. Further, in some embodiments, a raft 100 may not include any propulsion system, and may rely entirely on ocean currents to move through the water.

Figure 2D:
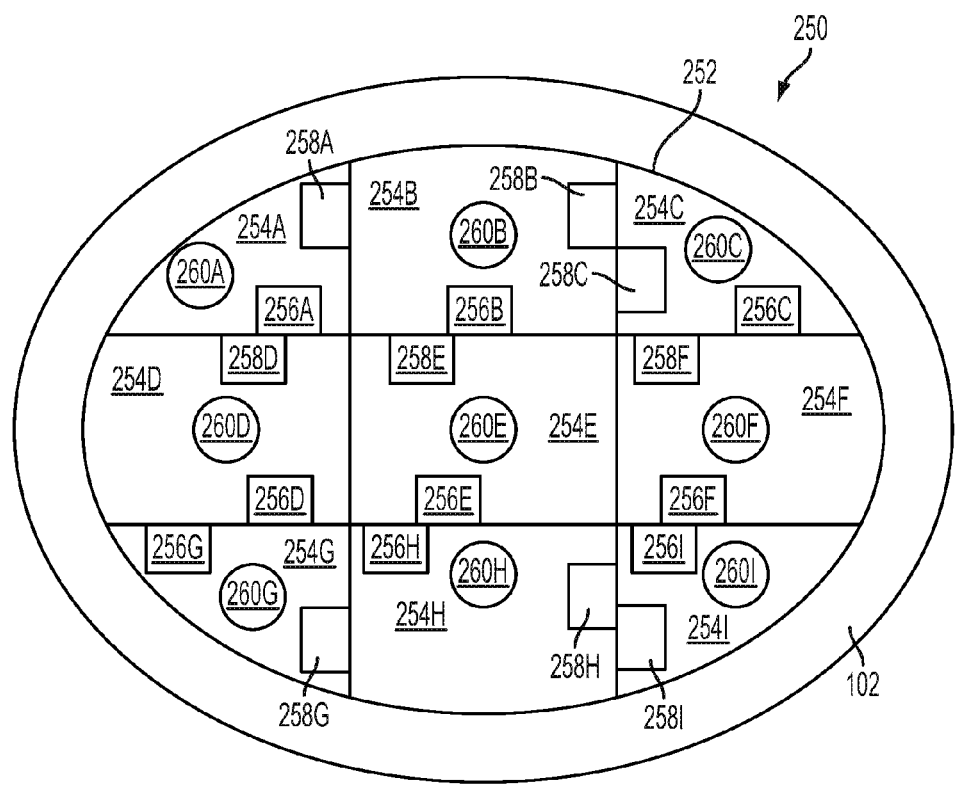
FIG. 2D is a simplified top-down view of a raft with a compartmentalized storage chamber, according to an example embodiment.

In some implementations, a raft may include a compartmentalized storage chamber. To illustrate, FIG. 2D is a simplified top-down view of a raft 250 with a compartmentalized storage chamber, according to an example embodiment. As shown, raft 250 includes a side feature 102. The inner walls of side feature 102 serve as the sides of a compartmentalized storage chamber 252 that includes nine sub-chambers 254A to 254. Note that more or less sub-chambers are possible, depending upon the particular implementation.

Each sub-chamber 254A to 254I may include a salinity sensor 256A to 256I, respectively, which is configured to indicate the salinity of water in the particular sub-chamber 254A to 254I. Each sub-chamber 254A to 254I may additionally or alternatively include a water-level sensor 258A to 258I, respectively, which is configured to indicate the amount and/or level of the water in the particular sub-chamber 254A to 254I. Further, the sub-chambers may include other types of sensors, in addition or in the alternative to salinity sensors and/or water-level sensors.

A compartmentalized storage chamber such as that shown in FIG. 2D, which may also be referred to as a multi-chamber water storage system, may help to reduce the risk of and/or mitigate the harm caused by seawater contamination (e.g., due to splashing or a leak). For example, if water splashes over a small area of the side feature 102, the contamination of the collected rainwater may be limited to one or two sub-chambers in that small area, thus preventing the seawater from contaminating the remaining sub-chambers. Other examples are also possible.

In a further aspect, each sub-chamber 254A to 254I may include a separate drain feature 260A to 260I, respectively. Configured as such, if the water in one sub-chamber is contaminated by seawater (as indicated by the sub-chamber's salinity sensor), then the water from the contaminated sub-chamber may be partially or wholly drained back into the ocean, without draining the collected rainwater from the other sub-chambers.

V. Illustrative Delivery Stations

FIG. 3A is a simplified illustration of a delivery station 300 according to an example embodiment. In the illustrated example, delivery station 300 is a floating near-shore delivery station, which is tethered to the ocean floor with a cable 302. However, it should be understood that in other implementations, a delivery station could be untethered (i.e., free-floating and/or powered by a propulsion system), could tethered to land instead of the ocean floor, and/or could be installed at a fixed location on land. Further, a delivery station could be implemented on a land-based mobile platform that could be moved to different coastal locations to receive water from rafts.

As shown, delivery station 300 may include structural and/or mechanical features to hold a raft 304 in place while water is transferred from the raft. Further, in order to transfer water from raft 304, delivery station 300 includes a pump 308. A pipe or tube 309, which could be rigid or flexible, can be connected to an inlet of the pump 308 on one end, and to a drain 310 from the raft's water storage chamber. The pump 308 may then be operated in order to pull water from the raft 304, through drain 310 and the pipe 309, to the delivery station. Further, in the illustrated configuration the pump 308 pushes from the raft 304 into a pipeline 312, which is used to transfer the water to land.

Figure 3:
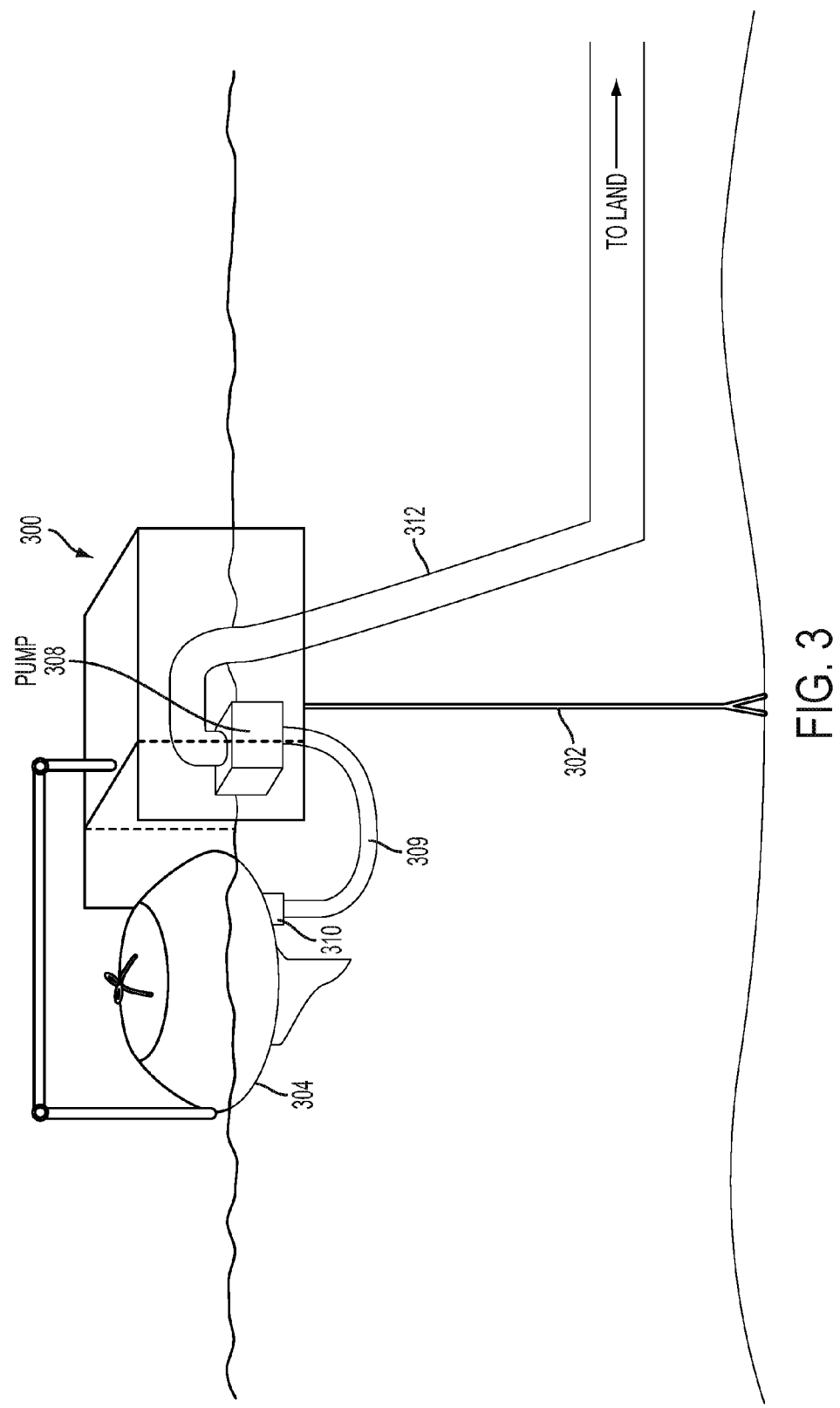
FIG. 3 is a simplified illustration of a delivery station, according to an example embodiment.
Figure 4:
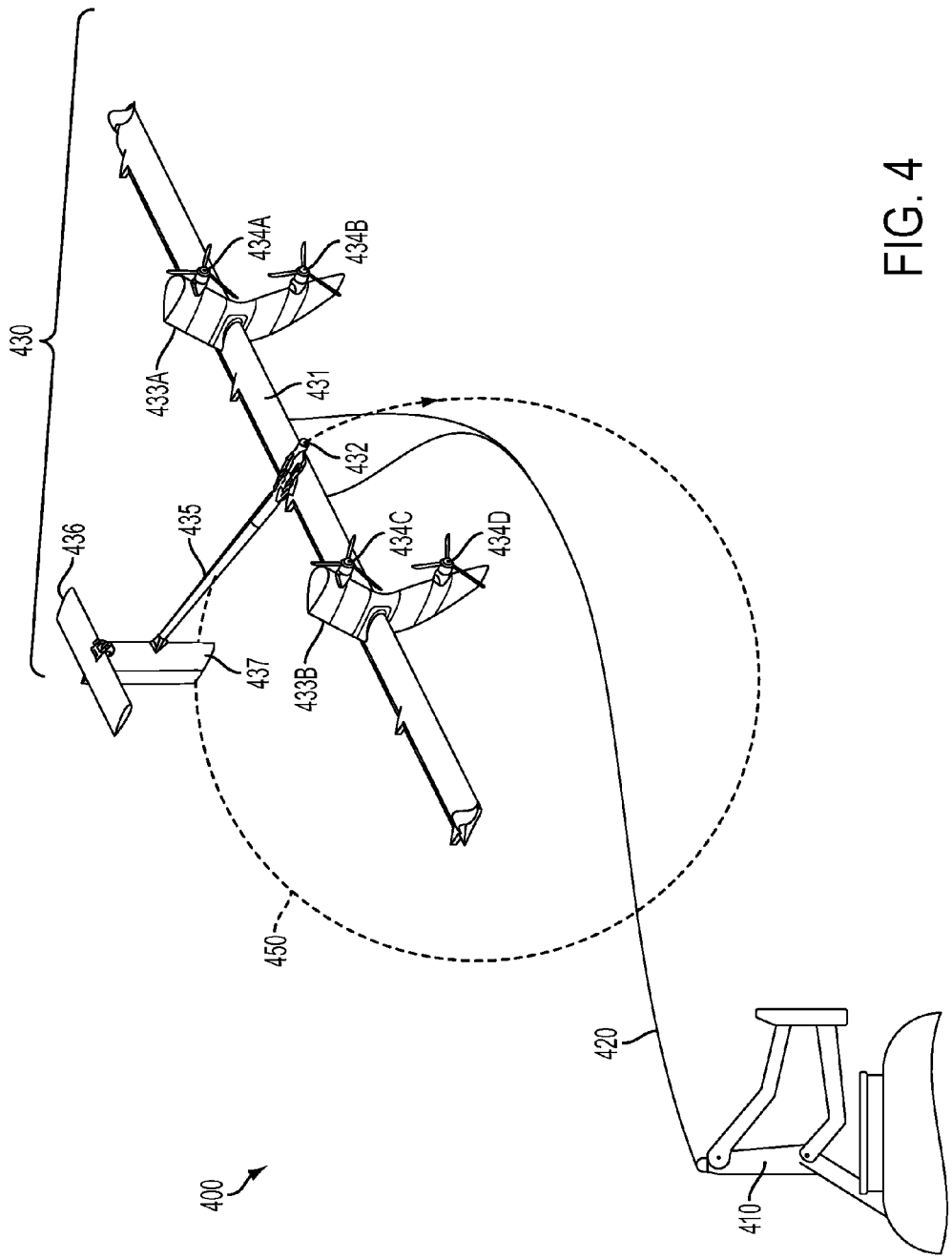
FIG. 4 depicts an airborne wind turbine, according to an example embodiment.
Figure 5:
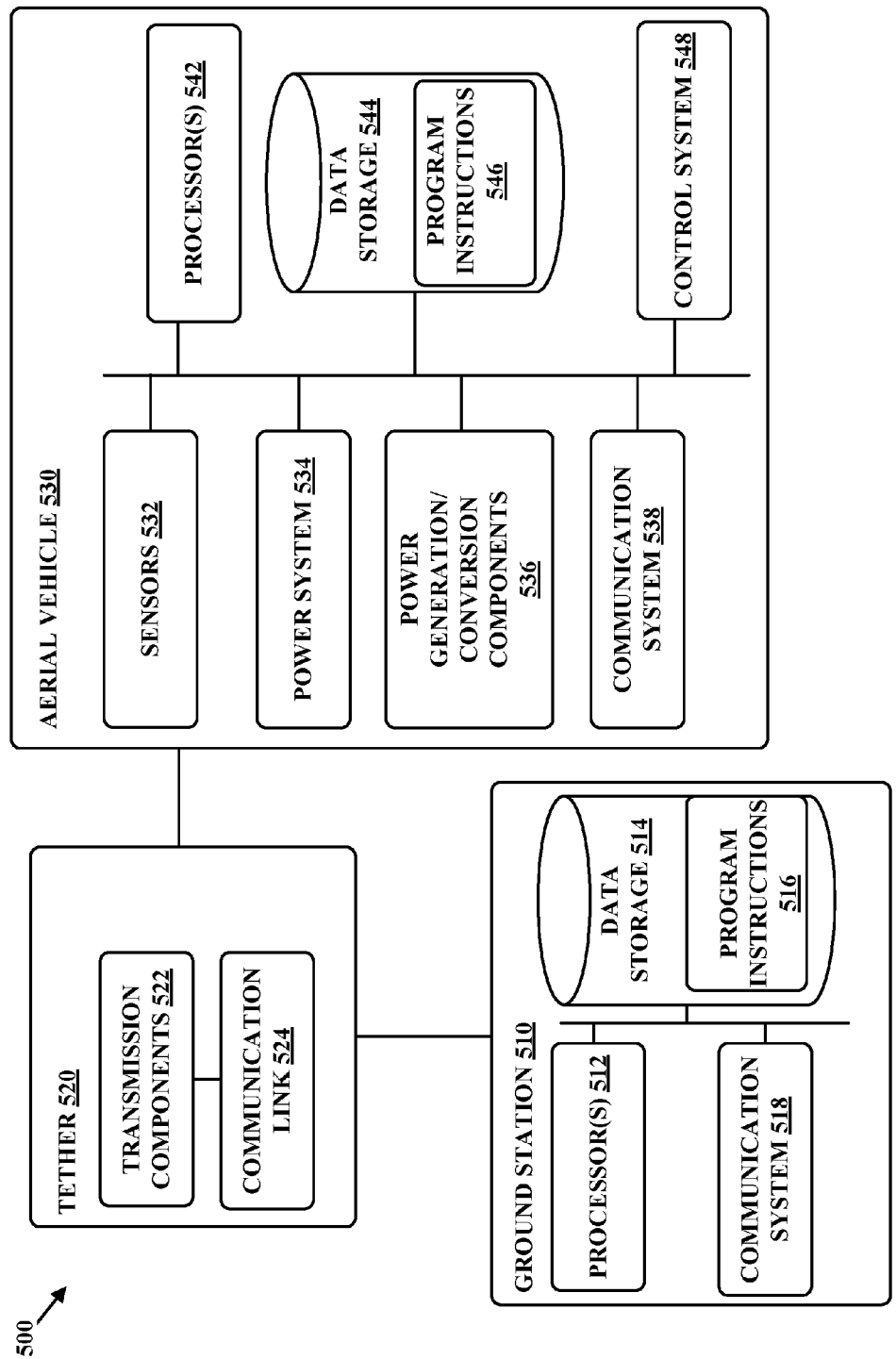
FIG. 5 is a simplified block diagram illustrating components of an airborne wind turbine, according to an example embodiment.

It should be understood that the configuration for transferring water from a raft that is shown in FIG. 3 is but one of many possible configurations. In general, water transfer from a raft to a delivery station may be accomplished using any type of mechanical and/or structural features that are capable of successfully transferring water from a raft. As such, the particular mechanical and/or structural features of a raft and/or of a delivery station, which provide for water transfer, may vary, depending upon the particular implementation.

In a further aspect, various types of "last-mile" transport are possible, in addition or in the alternative to pipeline 312. For example, specialized water-transfer barges could be used to transfer water from near-shore delivery stations to land. Other examples are also possible.

In a further aspect of some embodiments, a floating or land-based delivery station may be powered, at least in part, by an AWT, which is not shown in FIG. 3. In an example embodiment, the delivery station's AWT includes a tethered aerial vehicle that flies in a circular or ellipsoidal path in order to convert wind energy into electrical energy. The electrical energy is then relayed to the delivery station via the tether. The electrical energy may then be used to power various systems and/or components of the delivery station. Additionally or alternatively, electrical energy that is generated by an AWT may be relayed from the delivery station to the grid. For example, an electrical connection to the grid could be installed in or along a pipeline 312 to land, such that electrical energy that is generated by a floating AWT can be transferred to the grid. Other examples are also possible.

Note that an AWT may be less complex to install and use in the open ocean than other types of green power generation systems (e.g., traditional wind turbines). Further, an AWT may have greater power generation capabilities than other systems that can be readily installed on an delivery station, such as a solar power generation system. In a further aspect, the AWT's aerial vehicle could also serve as a propulsion system for the delivery station, e.g., by pulling it through the water in a desired direction. Illustrative AWTs are described in greater detail in section VI below.

VI. Illustrative Airborne Wind Turbines

As discussed generally above, an example raft and/or an example delivery station may be powered, at least in part, by a wind energy system, and in particular, by an airborne wind turbine system. An AWT may include an aerial vehicle that flies in a path, such as a substantially circular or elliptical path, to convert kinetic wind energy to electrical energy. In an example embodiment, the aerial vehicle may be connected to a ground station via a tether. The "ground station" may in fact be a component on a surface of a raft or a delivery station. Alternatively, if the aerial vehicle is tethered directly to a surface of a raft or a delivery station, the raft or delivery station itself may be considered the ground station. In any case, while tethered, the aerial vehicle may: (i) fly at a range of elevations and substantially along the path, and return to the ground, and (ii) transmit electrical energy to the ground station via the tether. Further, in some embodiments, the ground station may transmit electricity to the aerial vehicle for take-off and/or landing.

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, or crosswind flight.

In addition, the ground station 110 may include one or more components (not shown), such as a winch, that may vary a length of the tether 120. Such components will be described in greater detail later in this disclosure. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be used in the formation of aerial vehicle as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media may include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that may allow for both short-range communication and long-range communication. For example, ground station 210 may be configured for short-range communications using Bluetooth and may be configured for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material that may allow for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors, such as the rotors 134A to 134D. And in at least one such example, the one or more generators may operate at full-rated-power wind speeds of 11.5 meters per second, at a capacity factor which may exceed 60 percent. As such, the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

VII. Conclusion

While the examples described herein include only a single interface feature, it should be understood that in some embodiments, a peripheral device may include two or more interface features, which may be operable to control different functions of an HMD. Further, in some embodiments, a peripheral device may include a combination of two or more different types of interface features (e.g., a button and switch).

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

What is claimed is:

1. An autonomous ocean-going vessel comprising:
   a chamber for storing cargo contained within a volume of the chamber, wherein the cargo comprises water;
   a propulsion unit; and
   a housing comprising:
      a plurality of sensors that detect at least one environmental characteristic and at least one characteristic of the cargo contained within the volume of the chamber;
      a central control system that controls a direction of travel of the chamber based on feedback provided by the plurality of sensors; and
      a power generator that provides power to the sensors and the central control system.

2. The autonomous ocean-going vessel of claim 1, wherein the central control system controls the propulsion unit to control the direction of travel of the chamber.

3. The autonomous ocean-going vessel of claim 2, wherein the central control system determines one or more navigation parameters based on the at least one environmental characteristic detected by the plurality of sensors or the at least one characteristic of the cargo contained within the volume of the chamber.

4. The autonomous ocean-going vessel of claim 3, wherein the central control system controls, based on the one or more navigation parameters, the propulsion unit.

5. The autonomous ocean-going vessel of claim 3, wherein the central control system determines one or more navigation parameters by:
   determining that the risk to the cargo contained within the volume is equal to or above a predetermined threshold;
   in response to determining that the risk to the cargo is equal to or above the predetermined threshold, determining a first storage parameter.

6. The autonomous ocean-going vessel of claim 1, wherein the central control system is operated remotely.

7. The autonomous ocean-going vessel of claim 1, wherein the central control system operates without the use of GPS data.

8. The autonomous ocean-going vessel of claim 1, wherein the chamber for storing cargo comprises one or more openings that connect the chamber to a body of water in which the autonomous ocean-going vessel is navigating.

9. The autonomous ocean-going vessel of claim 8, wherein the central control system controls the size of the one or more openings.

10. The autonomous ocean-going vessel of claim 9, wherein the central control system controls the size of the one or more openings such that the one or more openings are closed.

11. The autonomous ocean-going vessel of claim 9, wherein the central control system controls the size of the one or more openings based on the at least one environmental characteristic or the at least one characteristic of the cargo contained within the volume of the chamber.

12. The autonomous ocean-going vessel of claim 1, wherein the at least one environmental characteristic comprises a salinity.

13. The autonomous ocean-going vessel of claim 1, wherein the at least one environmental characteristic indicates a weather condition.

14. The autonomous ocean-going vessel of claim 1, wherein the central control system controls the propulsion unit to control a depth in water of the autonomous ocean-going vessel.

15. The autonomous ocean-going vessel of claim 1, wherein the central control system controls the propulsion unit to maintain a geostationary position of the autonomous ocean-going vessel.

16. The autonomous ocean-going vessel of claim 1, wherein the central control system controls the propulsion to navigate the autonomous ocean-going vessel to a destination.

17. The autonomous ocean-going vessel of claim 1, wherein the central control system controls the propulsion unit to determine one or more navigation parameters based on feedback provided by the plurality of sensors.

18. The autonomous ocean-going vessel of claim 1, wherein the at least one environmental parameter includes a geographical position of the autonomous ocean-going vessel.

* * * * *